(12) United States Patent
Staudenrausch (10) Patent No.: US 9,282,754 B2
(45) Date of Patent: Mar. 15, 2016

(54) METHOD AND DEVICE FOR ADJUSTING THE COMPRESSION IN A VANE CELL PUMP

(75) Inventor: Martin Staudenrausch, Biberach (DE)

(73) Assignee: ALBERT HANDTMANN MASCHINENFABRIK GMBH & CO. KG, Biberach (DE)

( * ) Notice: Subject to any disclaimer, the term of this patent is extended or adjusted under 35 U.S.C. 154(b) by 210 days.

(21) Appl. No.: 13/491,717

(22) Filed: Jun. 8, 2012

(65) Prior Publication Data

US 2012/0315171 A1    Dec. 13, 2012

(30) Foreign Application Priority Data

Jun. 9, 2011 (EP) .................................... 11169341

(51) Int. Cl.
| | | |
|---|---|---|
| A22C 11/02 | (2006.01) | |
| A22C 11/08 | (2006.01) | |
| F04C 2/344 | (2006.01) | |
| F04C 13/00 | (2006.01) | |
| F01C 21/08 | (2006.01) | |

(52) U.S. Cl.
CPC ............. *A22C 11/0245* (2013.01); *A22C 11/08* (2013.01); *F01C 21/0836* (2013.01); *F04C 2/3442* (2013.01); *F04C 13/002* (2013.01)

(58) Field of Classification Search
CPC ..... A22C 11/08; F04C 13/002; F04C 14/223; F04C 14/24; F04C 2/3441; F04C 2/3442; F01C 21/0836; F01C 1/3441; B01F 5/12
USPC ............ 418/15, 23, 127, 255, 260, 1, 108, 98
See application file for complete search history.

(56) References Cited

U.S. PATENT DOCUMENTS

| | | | | |
|---|---|---|---|---|
| 835,045 | A | * | 11/1906 | Stoker ........................... 418/260 |
| 3,631,565 | A | | 1/1972 | Muller |
| 4,622,717 | A | * | 11/1986 | Bollinger ....................... 425/562 |
| 4,923,377 | A | * | 5/1990 | Cavalleri .......................... 418/98 |
| 4,995,804 | A | * | 2/1991 | Hirabayashi ..................... 418/15 |
| 5,052,974 | A | * | 10/1991 | Rather .................... A22C 11/08 452/41 |
| 5,102,314 | A | * | 4/1992 | Staudenrausch ................ 418/15 |
| 5,380,240 | A | * | 1/1995 | Staudenrausch .............. 418/261 |

FOREIGN PATENT DOCUMENTS

| | | |
|---|---|---|
| DE | 3909137 C1 | 5/1990 |
| DE | 19541088 A1 | 5/1996 |
| EP | 0084291 A1 | 7/1983 |
| EP | 0432388 A1 | 6/1991 |

OTHER PUBLICATIONS

European Patent Office Search Report for EP 11 16 9341, dated Nov. 21, 2011.

* cited by examiner

*Primary Examiner* — Jesse Bogue
*Assistant Examiner* — Thomas Olszewski
(74) *Attorney, Agent, or Firm* — Marshall, Gerstein & Borun LLP (57) ABSTRACT

A method for adjusting the compression in the vane cell chambers in the compression region of a vane cell pump for conveying pasty substance, in particular sausage meat, and a corresponding vane cell pump, wherein the compression is adjusted by changing the guide of the vane.

20 Claims, 11 Drawing Sheets

METHOD AND DEVICE FOR ADJUSTING THE COMPRESSION IN A VANE CELL PUMP

CROSS-REFERENCE TO RELATED APPLICATION

The present application claims the benefit of priority of European Application No. 11 169 341.2 filed Jun. 9, 2011. The entire text of the priority application is incorporated herein by reference in its entirety.

FIELD OF THE DISCLOSURE

The disclosure relates to a method for adjusting the compression in the vane cell chambers as well as a vane cell.

BACKGROUND

Every displacement pump, when opening the chambers, pulsates into the outlet (pressure side of the pump), regardless of the geometric pulsation. For this, the following conditions must be given:—the media to be conveyed is compressible;—there is a pressure difference between the outlet and the opening chamber of the pump. When opening the chamber into the outlet, there is a pressure equalization leading to a pulsation. The pressure may be higher in the last chamber upstream of the outlet than in the outlet. When opening the chamber, a pressure impulse then occurs in the direction towards the outlet of the conveying mechanism. On the other hand, the counter pressure in the outlet can be higher than in the last chamber, so that a pressure impulse occurs into the opening chamber. These recurring pressure impulses are referred to as pulsation. They ultimately affect the accuracy of the discharged portions because a different number of pressure impulses occurred within the discharged separated portions.

The greater the pressure difference, the chamber size and the compressibility of the medium, the greater the pulsation in the volume flow. If such a pump is used for producing individual portions, this inevitably leads to weight differences of the individual portions.

In order to prevent pulsation in the event of increased counter pressure in the outlet, the chamber pressure or the compression, respectively, can be increased and thus be adapted to the outlet pressure. When opening the chamber, pressure equalization in the outlet thus practically no longer occurs.

Figure 5:
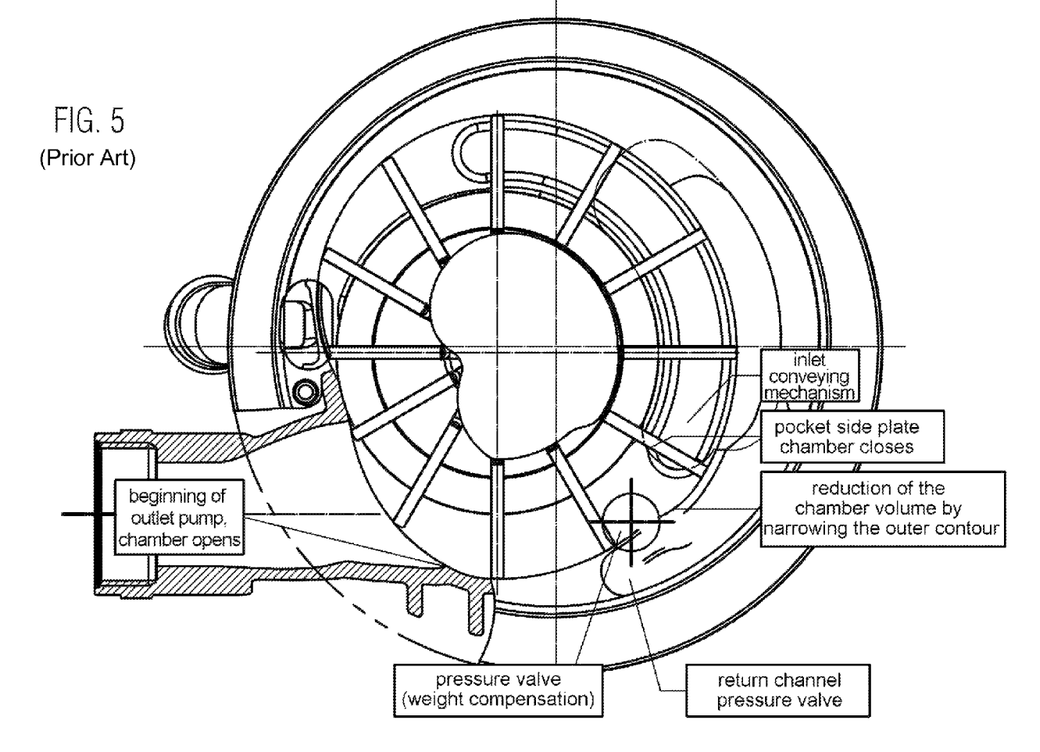
FIG. 5 schematically shows a plan view of a vane cell pump according to prior art.

In conventional vane cell pumps, as is particularly evident from FIG. 5, increased pressure is generated in the chambers which convey the pasty substance. The inlet for the pasty substance into the conveying mechanism is followed by a compression zone. By compressing the substance to be filled, i.e. by reducing the volume of the closed chambers, the pressure in the chamber is increased. In this, the radius of the outer contour, along which the pump vanes brush and seal the chamber, is reduced.

It is assumed in a simplified manner, that the compressibility of the medium to be filled is caused by its gas portion. This gas portion is usually air which is incorporated (intentionally or unintentionally) during production of the medium, e.g. sausage meat. For calculating the chamber pressure, it can therefore be assumed in a simplified manner for the gas portion of the medium, that: p×v=const.

It has already been attempted to change the compression. A groove or pocket is disposed in the top side plate, i.e. in the cover of the vane cell pump, on the side facing the chambers, so that a connection between the individual vane cell chambers and the inlet region is given. It can be influenced by means of the length of this pocket, that the chamber is closed later or earlier, or that the compression is lower or higher, respectively. However, since a conveying mechanism always conveys different media with varying compressibility, a pressure relief valve (see FIG. 5) must be installed via which, in case of overcompression, excess substance can be returned through the return channel into the supply region. This leads to unwanted stress and damage of the medium to be filled and can, for example, for raw sausage lead to "smudgy end products". In addition, this pocket in the side plate reshapes substance (depending on the length of the pocket and the compressibility of the medium), which can additionally be damaging, especially for sensitive products.

For changing the compression, a rotor with one or more or vanes or cells, respectively, can be used. In this manner, the chambers generally become smaller or larger. For the same reduction of the closed chamber, the chamber pressure increases all the more, the smaller the chamber was before the compression—and vice versa:

$$V2 = V1 - V \text{compression},$$

$$P2 = V1 \times P1 / (V1 - V \text{compression})$$

where $P1$, $V1$ are pressure and volume prior to compression, $P2$, $V2$ are pressure and volume after compression, and
$V$ compression is the compressed volume.

This, however, results in the following drawback: In order to have no geometric pulsation of the conveying mechanism, the pump interior contour can be geometrically configured to only one specific number of vanes. This means that weight fluctuations occur when a rotor having more or fewer vanes is used. In addition, a corresponding conversion is costly.

SUMMARY OF THE DISCLOSURE

Starting out from here, the present disclosure aims to provide an improved method for adjusting the compression as well as an improved vane cell pump enabling easy adjustment of the compression in the vane cell chambers.

According to the present disclosure, the compression can now be adjusted by changing the guidance of the vanes, i.e. by changing a guide contour of a guide device for the vanes. The vanes are radial movable and are driven by a rotor. The vanes are in particular mounted radially displaceably in the rotor. By means of a guide device, in particular a clamping eccentric, the vanes are moved in the radial direction towards the inner contour of the pump housing. This means that the position of the vanes is, on the one hand, determined by the inner contour of the pump housing and, on the other hand, by the guide device, i.e. in particular by the clamping eccentric, which is arranged in a rotationally fixed manner within (e.g. in the center) of the rotor or the pump, respectively, and for non-continuous vanes, an inner region of the vanes facing away from the inner contour of the pump along a determined guide contour.

The compression may now be adapted by changing the guide of the vanes, i.e. by their radial position or the distance of the vane front edge to the inner contour of the pump housing, respectively. If the vanes are now guided in such a manner that the pump vanes are guided not entirely outside at the inner contour of the pump housing, but in that a distance between the front edge of the vanes and the inner wall is formed, then no such high compression or no such high pressure, respectively, is generated in the vane cell chamber when the chamber is completely closed. The vane, depending on how far it is extended outwards, runs towards the inner contour of the pump housing which becomes narrower and then closes the chamber. Until complete closure of the vane cell chamber, filling material can flow back into the subsequent chamber through the gap between the vane and the inner wall.

The method according to the disclosure and the device according to the disclosure enable precise adjustment of the compression. Adjustment of the compression to different media is thus possible. The media can be conveyed in a very gentle manner, since little or no substance must be discharged via a relief valve. No filling media must be returned via the pocket in the side plate. According to the disclosure, by precisely adjusting the compression, the pressure in the vane cell chambers can be adjusted such that there is no pulsation and thus improved weight accuracy.

Advantageously, the guide of the vanes is adjusted in an adjustment region, which, when viewed in the direction of rotation of the pump, is located ahead of the compression region. The compression region is defined as the region in which the vane cell chambers are reduced in size between the inlet and the outlet, thus where the distance between the rotor and the inner wall of the pump housing decreases and the vanes close the vane cell chambers. The adjustment region extends at least from the end of an inlet region to a starting point of the compression region at which a vane closes a vane cell chamber so that pressure equalization can be effected between the inlet region and a region in which the vanes cells are reduced in size. An inlet region of the pump is understood to mean the portion that is disposed in a region of the inlet via which the pasty substance is supplied. The guide of the vanes is adjusted depending on the desired compression, resulting in a change in the vane position in the radial direction.

In this, the vanes can, for reducing compression, be guided such, that they are in the adjustment region not guided abutting the inner contour of the pump housing, in a manner that there is a gap (preferably having a width of 0.5-10 mm) between the vane tips and the inner wall of the pump housing. If, therefore, the pressure in the vane cell chamber is to be reduced, then the vanes are in the adjustment region guided such that they protrude less far in the direction of the pump housing. This means, that the compression in the vane cell chambers can be adjusted by changing the gap width and/or length (i.e. how far the gap extends in the rotational direction or where the point is located at which the vanes close the chamber, respectively).

The gap between the vane tips and the inner wall of the pump housing need not extend beyond the entire height of the vane.

The change of the vane guide can be effected in a simple manner by exchanging a guide device, in particular a clamping eccentric, for a guide device having a different guide contour. Replacing the clamping eccentric can be performed in a simple manner, in that the clamping eccentric, for instance, is simply plugged onto or screwed into a stationary support. Exchanging the guide device can be easily performed by the customer himself.

Additionally or alternatively, changing the guide can also be performed by adjusting the guide contour of a guide device, in particular, of the clamping eccentric. With a changed guide contour, a modified guide path of the vanes is thus achieved.

Alternatively or additionally, the guide of the vanes can also be changed such that, in the adjustment region, a guide element, e.g. an insert member, is disposed on the inner wall of the pump housing. The guide element advantageously extends over part of the height of the inner wall of the pump housing or the vane, respectively, such that a gap can still form between the vane front edge and the inner wall. It is also possible that the guide element extends over the entire height of the inner wall of the pump housing, so that the vane is pressed inwardly by the inner wall and the gap is formed between the vane front edge and the inner wall of the pump housing, in a rotational direction after the guide element.

The solution with a guide element is particularly advantageous for vane cell pumps having continuous vanes, which are likewise displaceably mounted in the rotor and the radial motion of which, i.e. displacement inwardly or outwardly, is determined only by means of the inner contour of the pump housing. The guide element can be inserted; but a segment of the inner wall can also be adjusted inwardly, i.e. toward the center.

By means of the centrifugal force, the vanes can by themselves, at very little friction and especially for watery media, run outwardly, even if they are guided by the clamping eccentric such that a distance from the inner wall is intended. This can be advantageous if the movement of the vanes outwardly in the direction of the pump housing is restricted by a suitable device. Such a device may for example be a guide element which is, as previously described, disposed on the inner contour of the pump housing. Such a device may alternatively or additionally be realized by a stop for the vanes on the rotor and/or a guide of the vane in the clamping eccentric restricting the movement of the vane in the direction of the pump housing.

A vane cell pump for performing the method comprises a pump housing, vanes, a rotor and a guide device for guiding the vanes in the radial direction. In this, the guide device is formed such that in an adjustment region, there is a gap between the vane tips and the inner wall of the pump housing. By adjusting the gap width or length, respectively, the compression or the pressure, respectively, in the vane cell chambers can be adjusted.

Advantageously, the gap has a width in a range from 0.5 to 10 mm, for example, at an intake quantity from 0.2 to 10 l. The gap width and/or length can be changed by changing the guide of the vanes, whereby the compression or the pressure, respectively, in the vane cell chambers changes. The end of the gap i.e., the beginning of the compression region or the point at which the vanes close the vane cell chambers is thus adjustable in a region between the end of the inlet region prior to the outlet and is preferably closer to the inlet than to the outlet. The beginning of the gap, which is likewise adjustable and can, when viewed against the rotational direction, extend into the inlet region or even into the suction region.

The vane cell pump can comprise multiple exchangeable guide devices, in particular multiple clamping eccentrics having different guide contours. The guide and ultimately the gap width and/or length can thus be adjusted by exchanging the guide device.

The clamping eccentric can also comprise a device for adjusting the guide contour and be formed in particular by two or more parts. The guide can be achieved for various media to be filled by an adjustable changing of position of the clamping eccentric segments relative to each other. It is also possible to remove parts of the clamping eccentric in order to change the guide contour. By means of an appropriate device for adjusting the guide contour, very precise and in particular stageless adjustment of the compression can be effected.

The guide device can also comprise a guide element in the adjustment region which is arranged on the inner wall of the pump housing and in particular extends over part of the height of the inner wall of the pump housing or the vanes, respectively. The disclosure shall be explained below in more detail with reference to the following figures. Adjustment of the guide contours can also be accomplished such that the guide device, in particular the clamping eccentric, is supported such that its position is adjustable in the radial direction, where e.g. the clamping eccentric can be adjustably supported in a long hole extending outwardly in the direction of the pump housing. If the compression is for instance to be reduced, then the guide device can be inwardly displaced and fixed such that the guide contour has an enlarged distance to the inner wall of the pump housing.

DETAILED DESCRIPTION OF THE PREFERRED EMBODIMENTS

Figure 1:
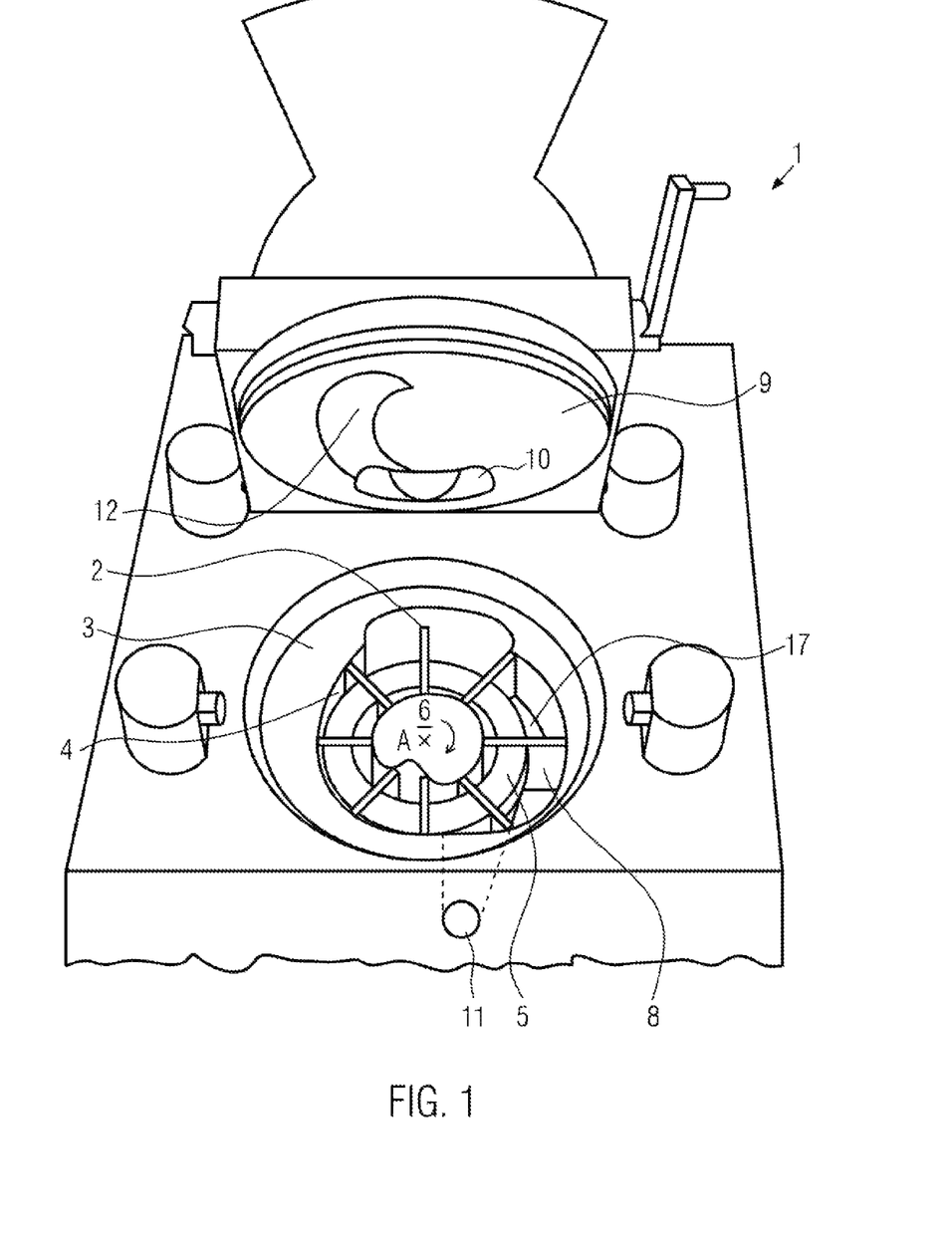
FIG. 1 schematically shows a vane cell pump according the present disclosure in a perspective view.
Figure 2:
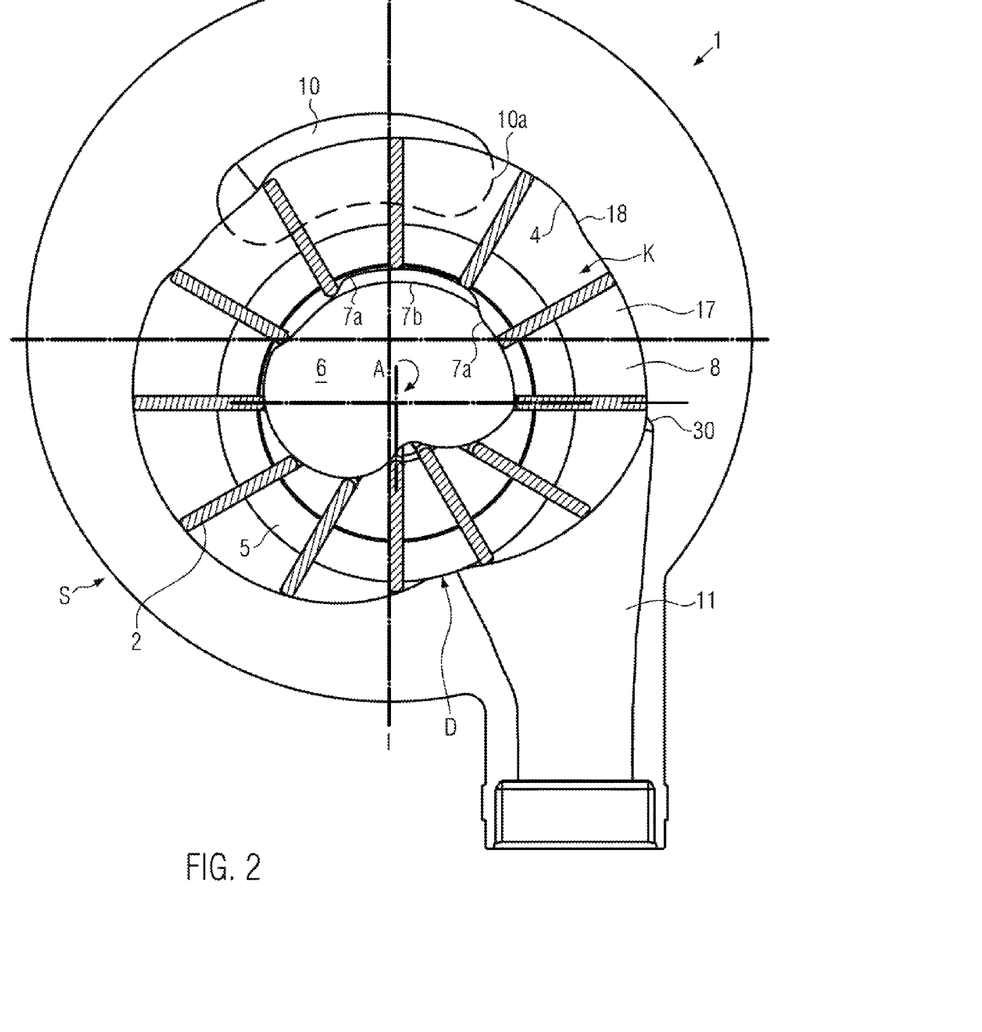
FIG. 2 schematically shows a plan view of a vane cell pump (without side plate) according to the present disclosure with a clamping eccentric for high compression.
Figure 3:
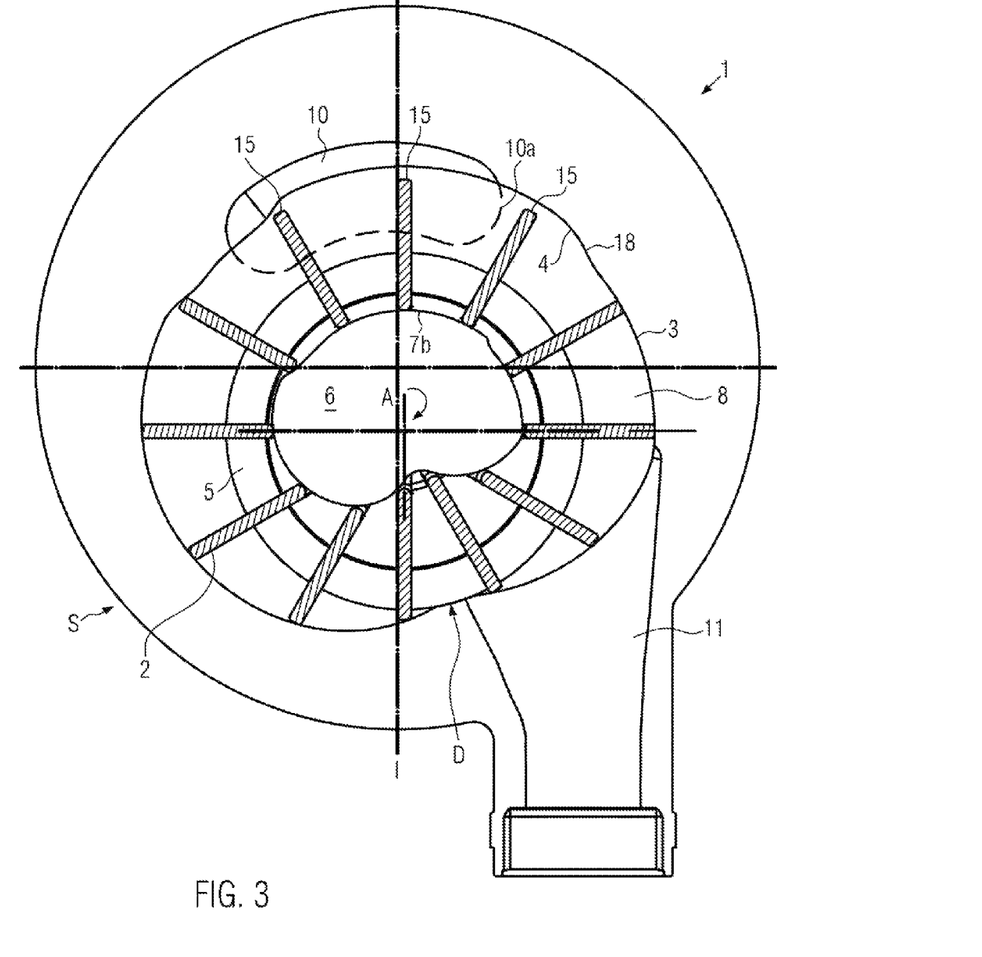
FIG. 3 schematically shows a plan view of a vane cell pump (without side plate) according to the present disclosure with a clamping eccentric for low compression.

FIG. 1 shows a vane cell pump according the present disclosure in a perspective view. FIGS. 2 and 3 show a plan view of a vane cell pump according to the present disclosure. The vane cell pump is in particular part of a filling machine, e.g. of the series VF600 by the Handtmann company—the assignee of the present application. As shown in FIGS. 1 to 3, the vane cell pump 1, for conveying pasty substance, in particular sausage meat, comprises a pump housing 3 and an inlet 10 for the pasty substance and an outlet 11 for the portioned substance. The inlet 10 is, for example, connected with the outlet of a hopper 101 (see FIG. 7), via which the pasty substance is supplied to the vane cell pump 1. The outlet 11 is, for example, connected with a filling tube 102 (see FIG. 7). Portioned pasty substance is in a known manner then pushed via the feed pipe 102 into the sausage casing or a coextruded sausage casing wrapped on the filling tube. The vane cell pump 1 comprises in the pump housing 3 a preferably eccentrically disposed rotor 5 that can be set into rotation and is driven via a pump shaft about the axis A. The central axis A is eccentrically disposed in the housing 3.

Figure 4A:
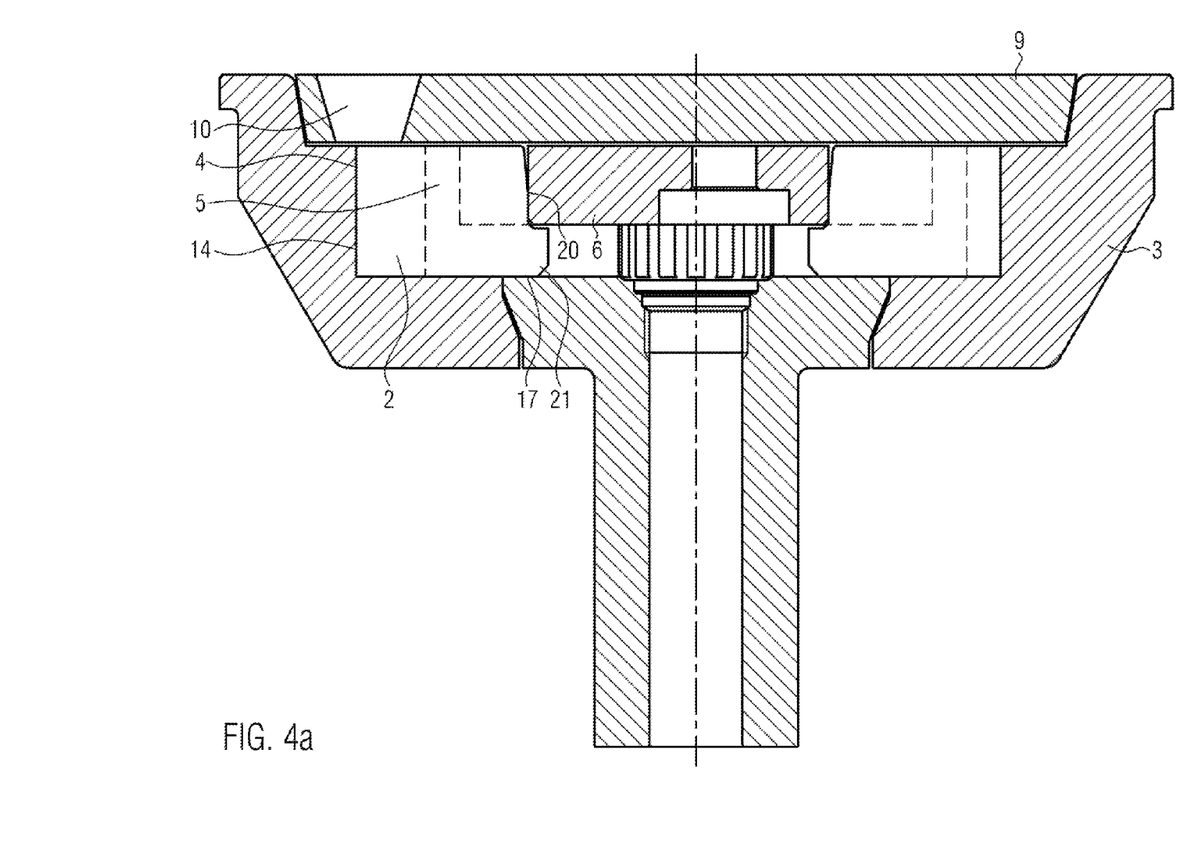
FIG. 4a shows a section along the line I-I in FIG. 2, without any gap between the vane tip and the inner wall of the pump housing.

The rotor 5 comprises vanes 2 mounted radially displaceably, which together with the inner contour of the pump housing or the inner wall 4, the base 17 of the pump housing 3 and the side plate or the cover 9 of the pump housing, respectively, form vane cell chambers 8 or conveying cells, respectively. The rotor 5 is arranged around a guide device, presently the clamping eccentric 6. The clamping eccentric is preferably eccentrically disposed in the pump housing 3. The clamping eccentric has the function of guiding the vanes, that are displaceably mounted in the rotor 5, according to its guide outer contour 7a, b in the radial direction. This means that the position of the vanes 2 is determined, on the one hand, by the inner contour of the pump housing and, on the other hand, by the guide contour of the clamping eccentric 6. The clamping eccentric is arranged in a rotatably fixed manner. As can be seen in particular in FIG. 4a, according to a preferred embodiment, the rotor can comprise radially extending recesses in which the blades 2 are mounted. The vanes 2 have a rear portion 20 which abuts the guide device 6, presently the clamping eccentric, and is thus guided. An L-shaped portion 21, which projects inwardly beyond the rear portion 20, is located in a region between the guide 6 and the base 17. In FIG. 4a, the guide device 6 is configured such that the front edge of the vane 14 abuts the housing inner wall 4. By rotating the rotor 5 or the vanes 2, respectively, pasty substance can in a known manner be conveyed in the conveyor cells 8 from the inlet 10 to the outlet 11.

The vane cell pump can be generally divided into several regions, as is shown in particular in FIGS. 2 and 3. One of these regions is the suction region S, another the pressure region or compression region K, respectively, where a sealing region D separates the compression region K from the suction region S. The compression region K begins in the rotational direction after the inlet 10 in a region 18, in which the vane cell chambers are reduced in size, i.e. in which the radius of the inner contour of the pump housing is reduced and the vane cell chambers are closed by the vanes. The outlet 11 begins after the end 30 of the compression region. This is followed by the sealing region D, which separates the pressure region from the suction region 5. The suction region begins at a point at which the gap-like distance between the rotor 5 and the inner wall 4 of the pump housing increases such that the vane cell chambers 8 again enlarge. The suction region extends until the beginning of the inlet 10. The pressure prevailing in the suction region is from 0.005 to 1 bar. As shown in FIG. 1, the cover or the side plate 9, respectively, on the side facing the conveying mechanism interior can comprise a recessed groove surface or recess 12 in the upper part of the suction region. The groove surface covers the vane cell chambers 8 in the suction region when the cover is closed and forms a gap between the cover lower side and the vane upper side whose size substantially corresponds to the groove depth. While the vane cell chambers 8 are essentially sealed in the compression region, the gap 12 between the individual vane cells forms a connection for generating a negative pressure.

In FIGS. 2 and 4a, the vanes 2 abut the region of the inlet 10 and in the compression region the inner contour or the inner wall 4, respectively, of the pump housing 3. In the compression region, the vanes 2 are pushed inwardly by the inner wall 4 and the corresponding guide contour 7a. The clamping eccentric 6 then in suction region S again pushes the vanes outwardly.

To adjust the pressure in the vane cell chambers 8, for example, to have it correspond to the pressure in the outlet 11, the guide of the vanes 2 is now adapted accordingly.

For reducing the pressure in the vane cell chambers 8, i.e. for reducing the compression, the guide contour 7a, as shown in FIG. 2, is changed according to the guide contour 7b, as shown in FIG. 3.

The guide contour changes, in particular, so that the vanes 2, prior to the beginning 18 of the compression region (this is where reduction of the chamber volume occurs) do not completely abut the outside of the inner contour of the pump housing, but are guided along the inner contour with a small gap of about 0.5 to 10 mm. This therefore achieves no such high compression, since the output chamber volumes are less than when the vane cell chambers 8 are complete closed.

Figure 4B:
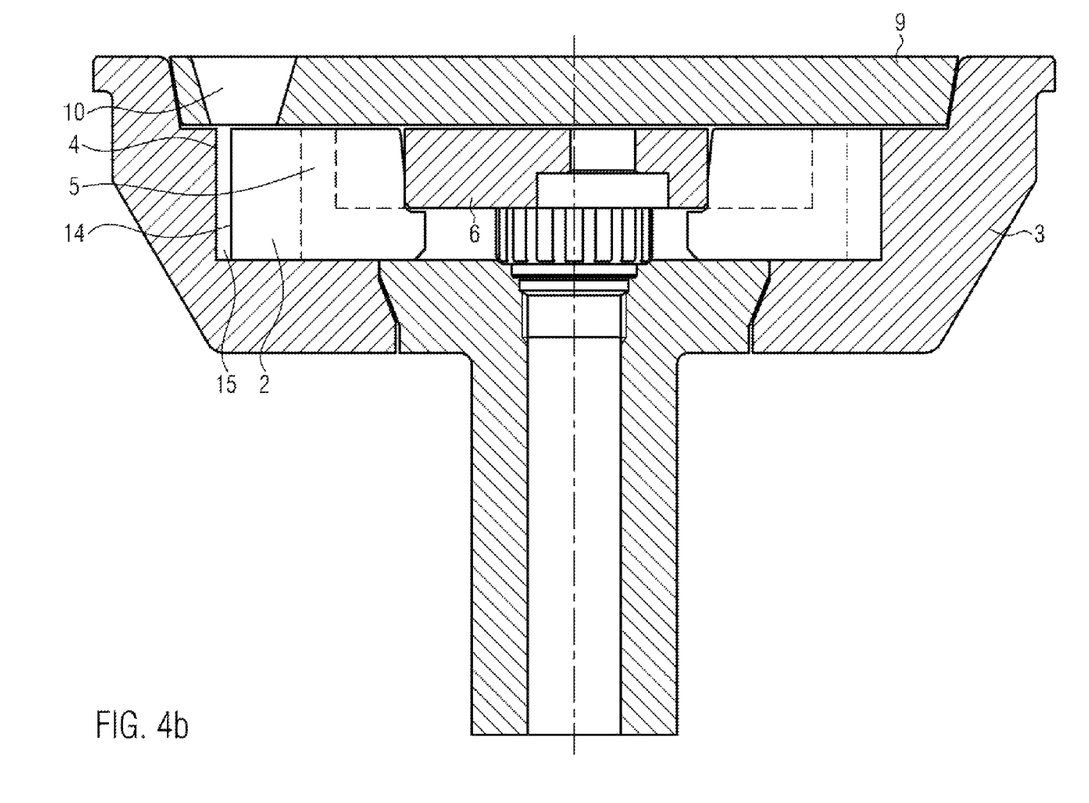
FIG. 4b shows a section along the line I-I with a gap between the vane tip and the inner wall of the pump housing.

FIG. 4a shows a longitudinal section along line I-I of FIG. 2, where the outer vane cell tip 14 or the front edge 14, respectively, abuts the inner wall 4 such that no gap is formed in a region prior to the compression region. FIG. 4b also shows a longitudinal section in a region prior to the compression region, where, however, due to the guide device 6, the vane 2 is not moved out as far as in FIG. 4a, so that a gap 15 is formed between the vane, i.e. the front edge of the vane 14 and the inner wall 4 of the pump housing 3.

As already mentioned, the change of the guide occurs in an adjustment region prior to the beginning 18 of the compression region K. The point 18 corresponds to the point at which a vane contacts the inner wall 4 of the pump housing and closes the respective vane cell. The point 18 is located in a region in which the distance between the rotor 5 and the inner wall 4 decreases. Preferably, this adjustment region is located in a region of the inlet 10 up to the beginning 18 of the compression region K. In any case, the gap should at least extent between the inlet end 10a up to a point 18, at which the vanes 2 close the chambers 8, such that there can be a pressure equalization between the vane cell chamber and the inlet region or the suction region, respectively.

To reduce the compression, the clamping eccentric 6 shown in FIG. 3 has the guide contour 7b inwardly offset compared to the guide contour 7a.

The vane 2, depending on how far it is extended outwards, runs to the inner contour of the pump housing, which becomes narrower, and then closes the chamber. Until complete closure of the vane cell chambers 8, pasty substance can flow back into the subsequent chamber through the gap 15 between the pump vane and inner wall 4 so that there is a reduction of compression.

If the compression is now to be adjusted to a certain filling medium such that the vane cell chamber pressure corresponds to the pressure in the outlet region, then the guide contour 7a, b can be changed such that a first clamping eccentric having the guide contour 7a (FIG. 2) is replaced by a clamping eccentric having a different guide contour 7b (FIG. 3). In this, the clamping eccentric 6 can for example stationarily fixed by clamping on, screwing in to a certain support. Preferably, a vane cell pump then comprises several clamping eccentrics 6 having different guide contours (for different gap widths s and lengths L), which can be exchanged for setting a desired compression pressure for adapting to a certain fill medium It is also possible that the clamping eccentric 6 be designed in two or more parts, so that adaptation to various media to be filled can be achieved by an adjustable change in position of the clamping eccentric segments. The distance between two clamping eccentric elements can for instance be adjusted and fixed by a corresponding adjustment device. It is also possible that one or more segments of the clamping eccentric can be dismantled to change the guide contour accordingly. Alternatively or additionally, it is also possible to mount the guide device, i.e. presently in particular the clamping eccentric 6, such that its position is adjustable in the radial direction, i.e. in a direction towards the pump housing, so as to adjust a corresponding guide contour 7a, b. For this purpose, the clamping eccentric 6 may for instance be adjustably mounted in a long hole extending outwardly in the direction of the pump housing. By moving and fixing the clamping eccentric in the long hole, a certain position, and thus a certain position of the guide contour 7a, b, and thus a certain gap width can be set.

In this manner, the pressure in the vane cell chambers can be adjusted by changing the guide of the vanes in the radial direction.

Figure 4C:
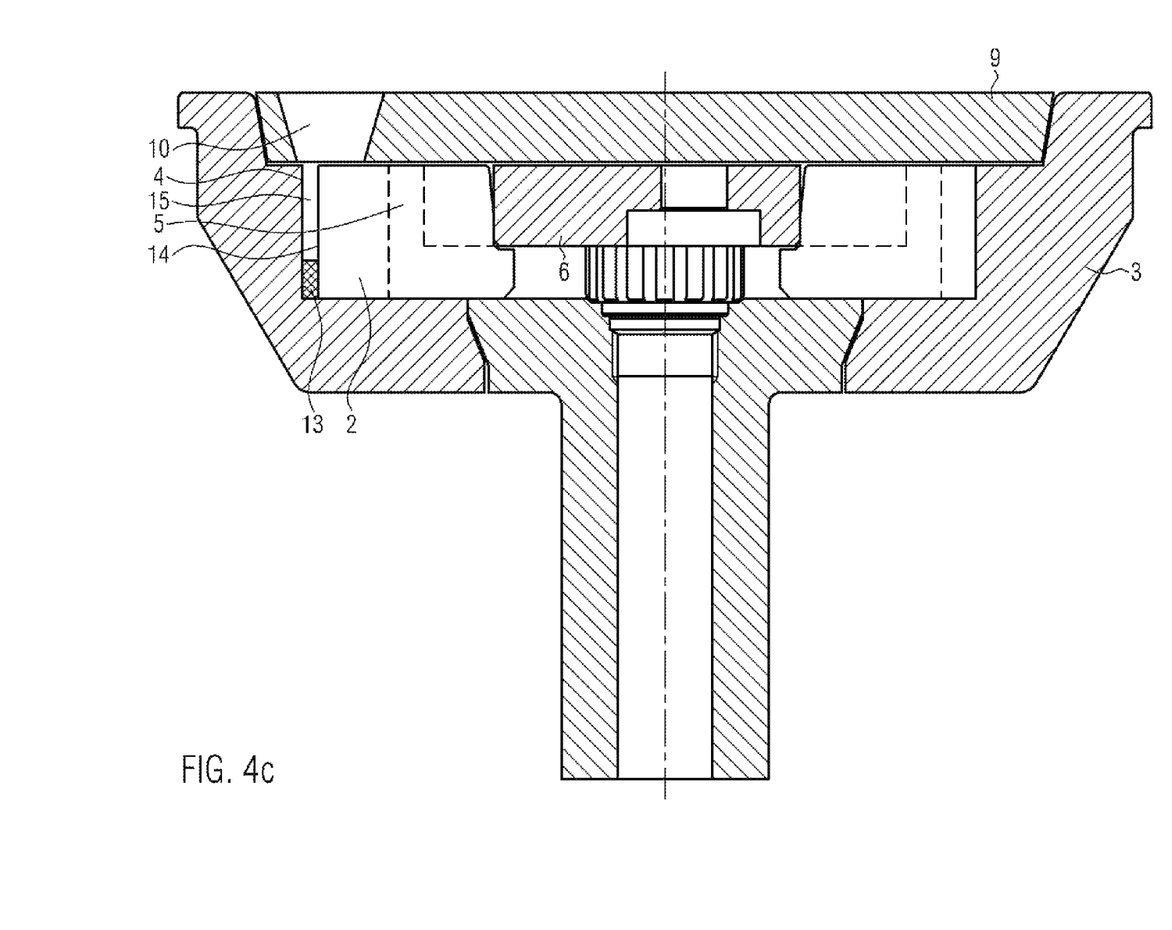
FIG. 4c shows a section through the vane cell pump with an inserted guide element.

Forming the gap 15, however, can not only be effected by changing the guide contour 7a, b of the clamping eccentric 6 but, additionally or alternatively, also by a guide element on the inner wall 4 of the pump housing 3 in the adjustment region. As shown in FIG. 4c, a respective guide element 13 is fastened in the region of the base 17 such that a distance is formed between the vane tip 14 or the front edge of the vane 14, respectively, and the inner wall 4. The guide element 13 can be inserted and fixed (by screwing, form-fitting insertion) or it is also possible that the guide element 13 be formed as a segment of the pump housing 3 and can be pushed inwardly and be fixed (for example, by a set screw) such that the gap 15 results. The gap width 15 is then preferably stagelessly adjustable. The guide element 13 does not need to extend over the entire height of the vane 2 or the inner wall 4, respectively, of the vane cell chamber 8.

Figure 6:
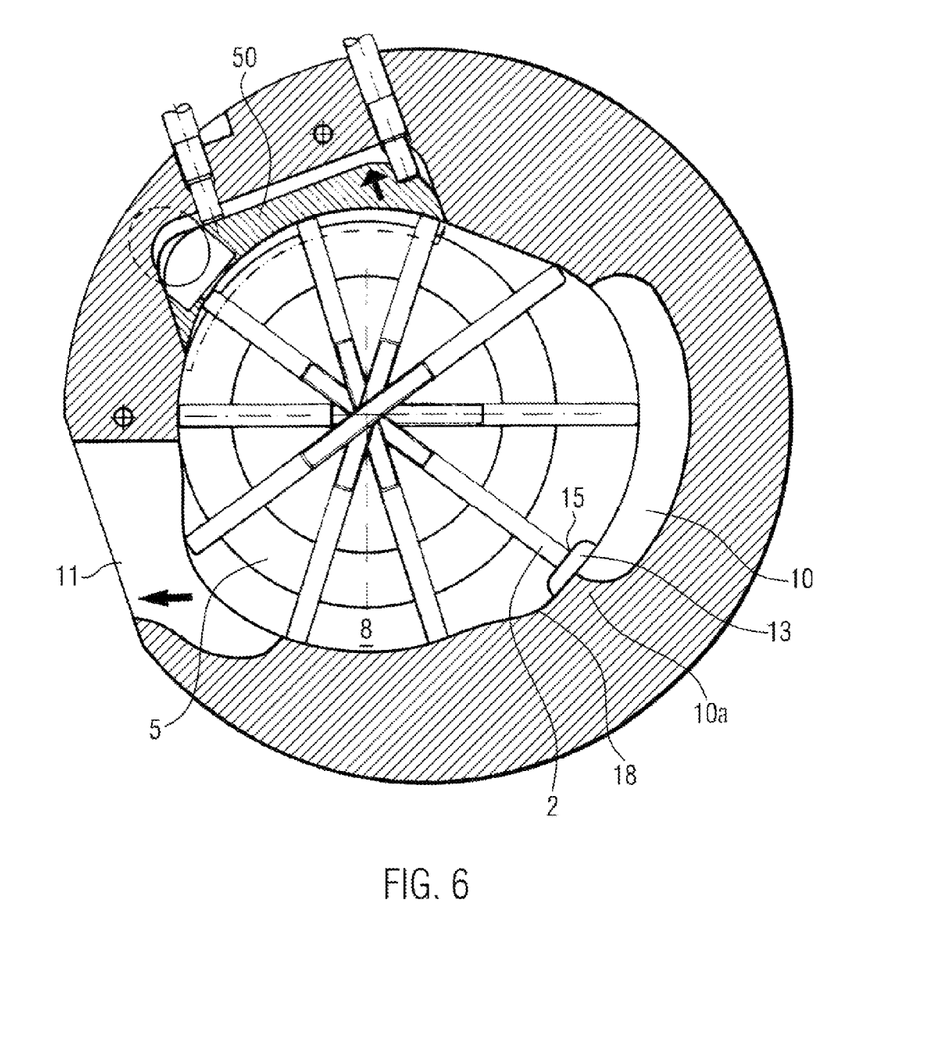
FIG. 6 schematically shows a cross-section through a vane cell pump with continuous vanes.

A change of the guide by means of the guide element 13 is suitable in particular for vane cell pumps with continuous vanes, as shown for example in FIG. 6. As is clear from FIG. 6, the vanes 2 are presently also mounted radially displaceable in the rotor 5, where guidance of the pump vanes is effected exclusively by means of the pump housing inner contour. Such a pump is for instance described in more detail in EP 0,432,388 B2. Displacement of the vanes, due the guide element for forming a gap 15, can be compensated on the opposite side by an insert member 50 being radially outwardly adjustable—presently by set screws—provided in the inner wall 4 and/or by vanes of different lengths. It is again true, that the guide element 13 is located at least in a region between the inlet end 10a and the beginning 18 of the compression region, such that the gap 15 is located at least in a region from the inlet end 10a to the beginning 18 of the compression region. (The guide element 13, however, does not need to extend over the entire region of point 10a to 18). In a further embodiment with continuous vanes, there is no guide element 13 provided in the aforementioned region. Guidance is effected by means of the contour of the inner wall 4 such that the gap 15 can result in the region from point 10a to 18. For this, a vane length allowing formation of the gap can be used. It is possible to adjust the insert member radially outwardly such that the gap 15 forms in the aforementioned adjustment region.

It is possible, given very little friction in the adjustment region, as shown in FIG. 3, that the vanes by themselves run outwardly due to the centrifugal force, in particular, with very watery media Then it is advantageous, if the device comprises an apparatus for restricting the vane movement outwardly in the direction of the pump housing 3.

Figure 4D:
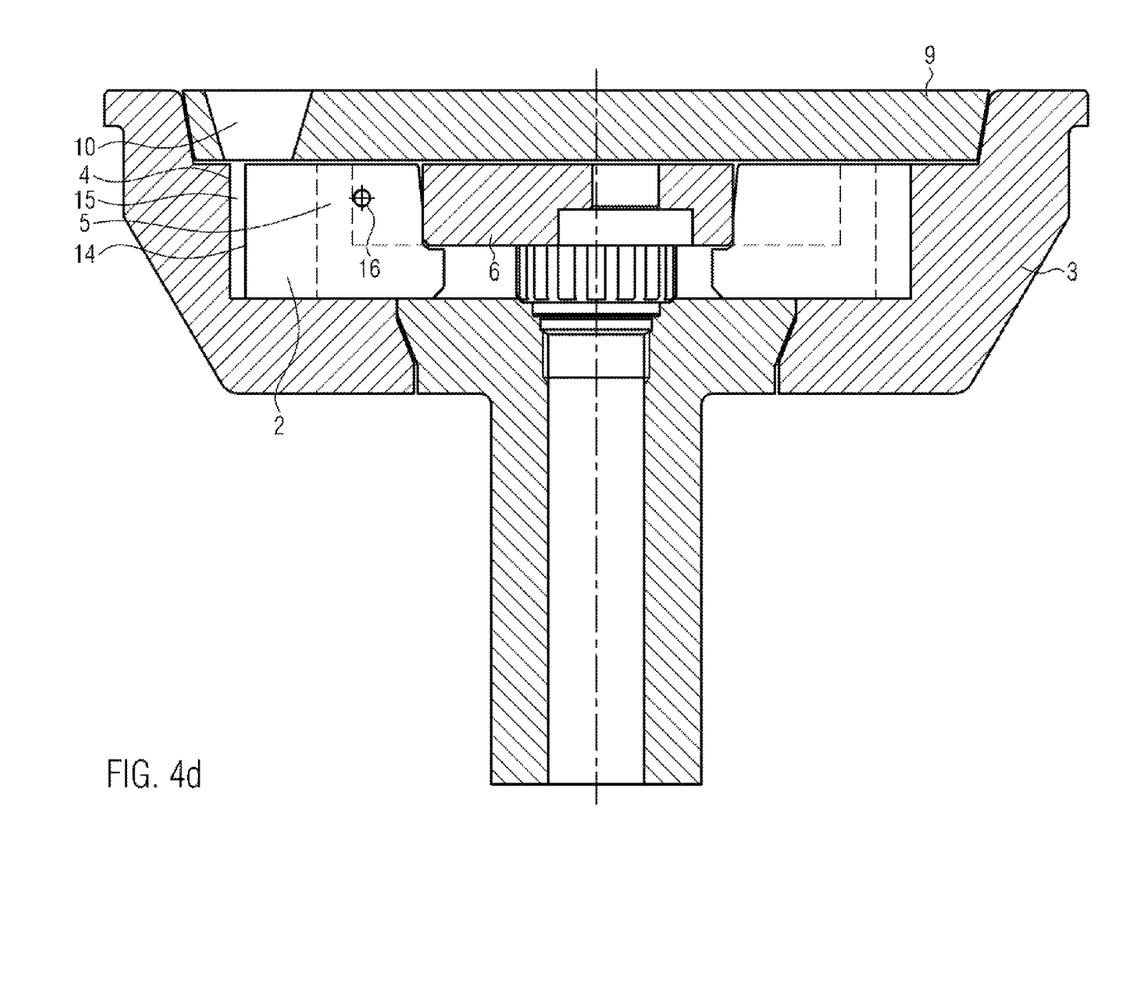
FIG. 4d shows a section through the vane cell pump showing a vane with a stop.
Figure 4E:
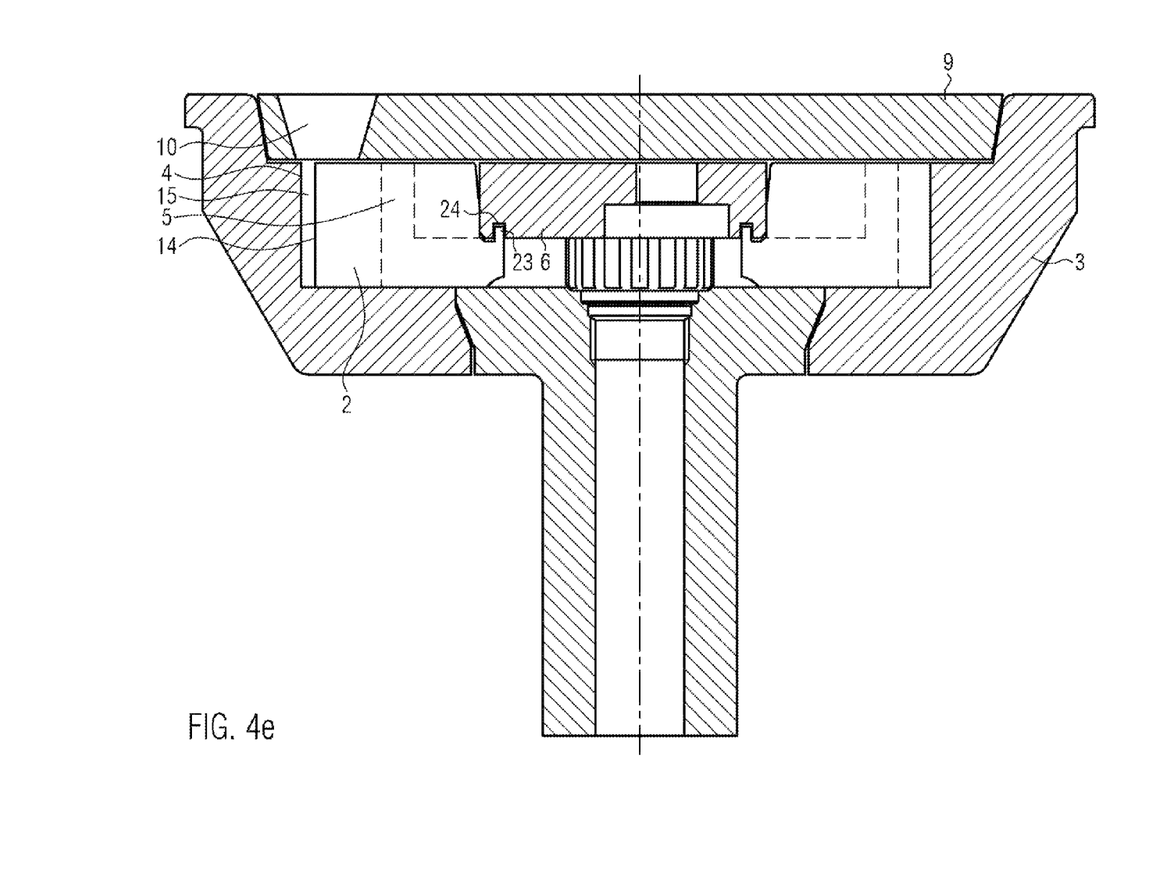
FIG. 4e shows a section through the vane cell pump showing a guide of the vane in the clamping eccentric, where movement of the vane is restricted in the direction of the pump housing.

FIG. 4d shows a partial cross-section showing a vane 2 with a stop. The stop 16, for example a pin, upon an outwardly movement of the vane 2, impacts the rotor 6 disposed outside the clamping eccentric 6 and thus restricts the outward movement such that the gap 15 in the adjustment region can be maintained. FIG. 4e shows a further option for restricting the outwardly movement of the vane 2. Here, the vanes 2 are guided in the clamping eccentric 6 such that a movement of the vane 2 is restricted in the direction of the pump housing. In this, a nose 23 of the vane can run in a corresponding groove 24 in the clamping eccentric, or vice versa, a nose of the clamping eccentric in the groove of the vane.

FIG. 4c shows a guide element 13, which can be formed as described in the context of FIG. 4c, and which also prevents the vane's "running out" prior to the compression region.

By insertion of guide elements 13 having different dimensions and/or exchanging the clamping eccentric, the gap width s and/or length l (i.e. the point 18 at which the vane cell chambers are closed by the vanes) of the gap 15 and thus the compression can be adjusted.

The method according to the disclosure is described below in more detail with reference to the figures.

First, guide tracks of the vanes are determined for different media, by which a particular pressure is generated in the vane cell chambers 8 in the compression region.

Figure 7:
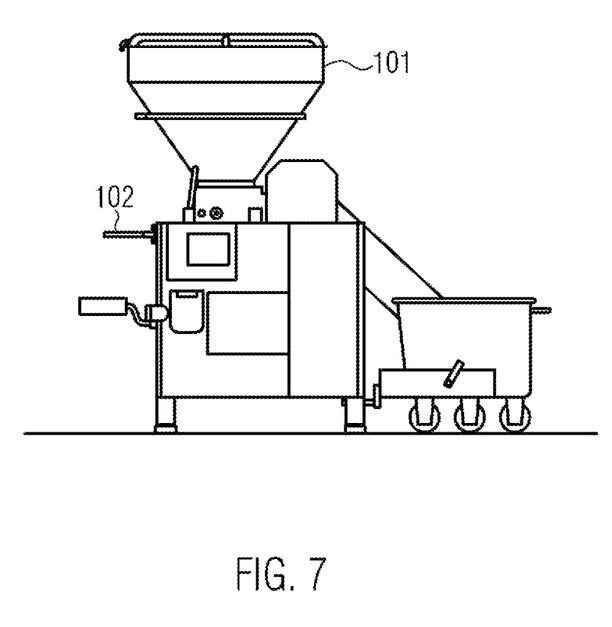
FIG. 7 schematically shows a filling machine.

For a particular pasty substance to be filled via the filling machine, as shown in FIG. 7, for instance, a certain clamping eccentric 6 having a respective guide contour 7a, b is then inserted into the vane cell pump. Additionally or alternatively, a respective guide element 13 (see FIG. 4c) can be inserted.

At a very high compression, for instance a clamping eccentric as shown in FIG. 2 is used, where there is presently no gap 15, in a region between the end 10a of the inlet region 10 and the compression region, presently the point at which the vane chambers decrease in size and the chambers 8 are closed.

If a pasty substance is to be filled for which the compression is to be reduced, a clamping eccentric 6 having a guide contour 7b is inserted such that a gap 15 is formed in the adjustment region, i.e. at least between point 10a and point 18, at which the chambers 8 are closed. Alternatively or additionally, a respective guide element 13 is used.

In this, the pasty substance to be filled is supplied via the inlet 10 to the vane cell pump and conveyed in the direction of rotation towards outlet 11. The vane cells in the region of the inlet 10 here have a distance to the inner wall 4, for example, in a range from 0.5 to 10 mm, where the desired compression is adjustable by means of the distance. The vanes 2, in dependency of how far they are extended by the clamping eccentric 6, then run towards the narrower pump outer contour and then close the chamber completely. Until complete closure of the vane cell chambers 8, filling material can still flow back into the subsequent chamber through the gap 15 between the vane 2 and inner wall 4 of the pump housing, thus reducing the obtainable pressure in the vane cell chamber. The compression is also influenced by the length of the gap, i.e. at which point 18 the vane cell chambers are completely closed. The longer or wider the gap 15, the smaller the compression.

Here, the gap is preferably at least in a region between the inlet region end 10a and the inner contour of the pump housing 3 already becoming narrower.

If in a further process, one wants to fill a different medium, then the guide means 6, 13 can be replaced or adapted accordingly in order to adjust the guide of the vanes. In this manner, the pressure in the vane cell chambers 8 can be precisely adjusted and adapted to the pressure in the outlet region 11 such that pulsation never occurs and therefore higher weight accuracy can be achieved for the filled portions. The changes can be easily performed by the customer.

The invention claimed is:

1. A method for adjusting compression in vane cell chambers in a compression region of a vane cell pump for conveying pasty substance, wherein the compression region is defined as the region in which the vane cells are reduced in size between an inlet and an outlet and the distance between a rotor and an inner wall of the pump housing decreases, the vane cell pump including a plurality of vanes that at least partially define the vane cell chambers, the method comprising changing a guide device of the vanes to adjust the compression in the compression region, the changing comprising forming a gap between vane tips of the vanes and the inner wall of the pump housing of the vane cell pump, the gap being formed in an adjustment region upstream of the compression region and the adjustment region extending at least from one end of the inlet to a beginning point of the compression region at which a vane closes a vane cell chamber, the changing further comprising changing the shape of the guide devices so that at least one of a width and a length of the gap is adjusted, such that filling material can flow back into the subsequent chamber through the gap between the vane and the inner wall, and changing the guide device further comprising replacing the guide device with a guide device having a different guide contour.

2. The method according to claim 1, wherein changing the guide device comprises adjusting the guide device of the vanes based on a desired compression, and wherein adjusting the guide device changes a radial position of the vanes in the adjustment region.

3. The method according to claim 1, wherein changing the guide device comprises adjusting a guide contour of the guide device.

4. The method according to claim 3, wherein the guide device comprises a clamping eccentric.

5. The method according to claim 1, wherein changing the guide device of the vanes comprises providing a guide element in the adjustment region at the inner wall of the pump housing.

6. The method according to claim 1, further comprising disposing, in the vane cell pump, a device for restricting movement of the vanes outwardly in the direction of the pump housing.

7. The method according to claim 1, wherein changing the guide device of the vanes comprises adjusting the guide device in a radial direction based on the pasty substance to be conveyed.

8. The method according to claim 1, wherein the pasty substance is sausage meat.

9. The method according to claim 1, wherein the replaced guide device comprises a clamping eccentric.

10. A vane cell pump for conveying pasty substance, the vane cell pump comprising a pump housing, vanes having vane tips, a rotor, and a guide device for guiding the vanes in the radial direction, wherein the guide device is formed such that a gap is formed between the vane tips and the inner wall of the pump housing, the gap being formed in an adjustment region upstream of a compression region, wherein the compression region is defined as the region in which the vane cells are reduced in size between an inlet and an outlet and the distance between a rotor and an inner wall of the pump housing decreases the adjustment region extending at least from one end of the inlet of the vane cell pump to a beginning of the compression region, wherein at least one of a width and a length of the gap can be adjusted by changing the guide device, thereby changing a compression in the compression region, such that filling material can flow back into the subsequent chamber through the gap between the vane and the inner wall, and wherein the guide device is interchangeable with one or more different guide devices having different guide contours.

11. The vane cell pump according to claim 10, wherein the width of the gap is in a range from 0.5 to 10 mm.

12. The vane cell pump according to claim 10, wherein in the adjustment region the vane cell pump comprises a guide element which is arranged at an inner wall of the pump housing and extends over part of the height of the vanes.

13. The vane cell pump according to claim 10, wherein the guide device is adjustable in a radial direction and the guide device is adjustably supported in a long hole extending outwardly in the direction of the pump housing.

14. The vane cell pump according to claim 13, wherein the guide device comprises a clamping eccentric.

15. The vane cell pump according to claim 10, wherein the one or more different guide devices comprise a clamping eccentric.

16. The vane cell pump according to claim 15, wherein the clamping eccentric comprises a device for adjusting the guide contour and is formed by two or more parts.

17. The vane cell pump according to claim 16, wherein the vanes further comprise a device for restricting outward movement of the respective vane toward the pump housing.

18. The vane cell pump according to claim 17, wherein the device for restricting outward movement comprises a guide element disposed at an inner contour of the pump housing, a stop for the vanes at the rotor, a guide for the vane in the clamping eccentric to restrict movement of the vane in the direction of the pump housing, or combinations thereof.

19. A method for adjusting compression in vane cell chambers in a compression region of a vane cell pump for conveying pasty substance, wherein the compression region is defined as the region in which the vane cells are reduced in size between an inlet and an outlet and the distance between a rotor and an inner wall of the pump housing decreases, the vane cell pump including a plurality of vanes that at least partially define the vane cell chambers, the method comprising changing a guide device of the vanes to adjust the compression in the compression region, the changing comprising forming a gap between vane tips of the vanes and the inner wall of the pump housing of the vane cell pump, the gap being formed in an adjustment region upstream of the compression region and the adjustment region extending at least from one end of the inlet to a beginning point of the compression region at which a vane closes a vane cell chamber, the changing further comprising changing the shape of the guide devices so that at least one of a width and a length of the gap is adjusted, such that filling material can flow back into the subsequent chamber through the gap between the vane and the inner wall.

20. A vane cell pump for conveying pasty substance, the vane cell pump comprising a pump housing, vanes having vane tips, a rotor, and a guide device for guiding the vanes in the radial direction, wherein the guide device is formed such that a gap is formed between the vane tips and the inner wall of the pump housing, the gap being formed in an adjustment region upstream of a compression region, wherein the compression region is defined as the region in which the vane cells are reduced in size between an inlet and an outlet and the distance between a rotor and an inner wall of the pump housing decreases the adjustment region extending at least from one end of the inlet of the vane cell pump to a beginning of the compression region, wherein at least one of a width and a length of the gap can be adjusted by changing the shape of the guide device, thereby changing a compression in the compression region, such that filling material can flow back into the subsequent chamber through the gap between the vane and the inner wall.

* * * * *